(12) United States Patent
Liu et al.

(10) Patent No.: US 12,287,781 B2
(45) Date of Patent: *Apr. 29, 2025

(54) ENFORCING BOTH SYNTACTIC AND SEMANTIC CORRECTNESS OF DOMAIN-SPECIFIC DATA QUERIES

(71) Applicant: Microsoft Technology Licensing, LLC, Redmond, WA (US)

(72) Inventors: Lengning Liu, Redmond, WA (US); Tanuja Machineni, Redmond, WA (US); Chad Michael Heyne, Redmond, WA (US); Manohar Sreenivasachar, Redmond, WA (US); Richard T. Guy, Seattle, WA (US); Roji Pulimoottil Thomas, Issaquah, WA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/413,906

(22) Filed: Jan. 16, 2024

(65) Prior Publication Data

US 2024/0152509 A1    May 9, 2024

Related U.S. Application Data

(63) Continuation of application No. 17/331,584, filed on May 26, 2021, now Pat. No. 11,907,209.

(51) Int. Cl.
*G06F 16/00* (2019.01)
*G06F 16/242* (2019.01)
*G06F 16/2455* (2019.01)
*G06F 40/211* (2020.01)
*G06F 40/30* (2020.01)

(52) U.S. Cl.
CPC ...... *G06F 16/2423* (2019.01); *G06F 16/2445* (2019.01); *G06F 16/24565* (2019.01); *G06F 40/211* (2020.01); *G06F 40/30* (2020.01)

(58) Field of Classification Search
None
See application file for complete search history.

(56) References Cited

U.S. PATENT DOCUMENTS 9,535,902 B1 * 1/2017 Michalak ............ G06F 16/3331
11,907,209 B2 * 2/2024 Liu ........................ G06F 16/242

* cited by examiner

*Primary Examiner* — Tuankhanh D Phan
(74) *Attorney, Agent, or Firm* — Foley IP Law, PLLC

(57) ABSTRACT

Solutions for enforcing both syntactic and semantic correctness of domain-specific data queries include: receiving a data query; constraining an operation of the data query to enforce semantic correctness, wherein enforcing semantic correctness comprises: determining semantic information associated with each of a plurality of data entities; based on at least the semantic information, determining whether combining the two data entities of the plurality of data entities is allowed or is not allowed; based on at least determining that combining the two data entities is allowed, permitting combining the two data entities in the data query; and based on at least determining that combining the two data entities is not allowed, preventing combining the two data entities in the data query; and executing the data query. Some examples further include basing the permission on (at least) an ontology between the semantic information of the two data entities and a set of axioms.

20 Claims, 10 Drawing Sheets

```
SELECT *
FROM Customer
```

SELECT Customer.C1, Dim2.D1, avg(Sales)
FROM Customer
INNER EXPLODE JOIN Activity2 ON Customer.AltKey = Activity2.CID
INNER JOIN Dim2 ON Activity2.Dim2Key = Dim2.Key
GROUP BY Customer.C1, Dim2.D1

SELECT DISTINCT Customer.CustomerId, Customer.C1, Customer.C2
FROM Customer
INNER EXPLODE JOIN Activity1 ON Customer.AltKey = Activity1.PK
INNER JOIN Dim2 ON Activity1.Dim2Key = Dim2.Key
INNER JOIN Measure1 ON Customer.C1 = Measure1.C1 AND Dim2.D1 = Measure1.D1
WHERE Activity1.ExpectedSales >= Measure1.avg(Sales)

ENFORCING BOTH SYNTACTIC AND SEMANTIC CORRECTNESS OF DOMAIN-SPECIFIC DATA QUERIES

CROSS-REFERENCE TO RELATED APPLICATION

This application is a continuation application of and claims priority to U.S. patent application Ser. No. 17/331,584, entitled "ENFORCING BOTH SYNTACTIC AND SEMANTIC CORRECTNESS OF DOMAIN-SPECIFIC DATA QUERIES," filed on May 26, 2021, the disclosure of which is incorporated herein by reference in its entirety.

BACKGROUND

Structured query language (SQL) queries of databases require syntactic correctness, in order to execute properly. Programming with correct syntax may be challenging, even for experienced programmers. In order to assist programmers with syntax, graphical query builders exist that intake graphical elements of a visual builder representation of a data query (e.g., an SQL query) and automatically generate query instructions that are syntactically correct for performing operations on data entities.

Unfortunately, merely ensuring that query instructions are syntactically correct does not mean that the operations provide meaningful or useful results. For example, a programmer may compute average sales volume for different retail outlets without realizing that data for different outlets may be tracked in different currency units (e.g., dollars for one, but euros for another), or use different time bases (e.g., sales per week for one, but sales per month for another). Thus, programming tools that enforce only syntactic correctness of data queries do not provide a complete solution for business intelligence (BI) tasks.

SUMMARY

The disclosed examples are described in detail below with reference to the accompanying drawing figures listed below. The following summary is provided to illustrate some examples disclosed herein. It is not meant, however, to limit all examples to any particular configuration or sequence of operations.

Solutions for enforcing both syntactic and semantic correctness of domain-specific data queries include: receiving a data query; constraining an operation of the data query to enforce semantic correctness, wherein enforcing semantic correctness comprises: determining semantic information associated with each of a plurality of data entities; based on at least the semantic information, determining whether combining the two data entities of the plurality of data entities is allowed or is not allowed; based on at least determining that combining the two data entities is allowed, permitting combining the two data entities in the data query; and based on at least determining that combining the two data entities is not allowed, preventing combining (e.g., joining, aggregating, or grouping) the two data entities in the data query; and executing the data query. Some examples further include basing the permission on (at least) an ontology between the semantic information of the two data entities and a set of axioms.

BRIEF DESCRIPTION OF THE DRAWINGS

The disclosed examples are described in detail below with reference to the accompanying drawing figures listed below.

Corresponding reference characters indicate corresponding parts throughout the drawings.

DETAILED DESCRIPTION

Figure 1:
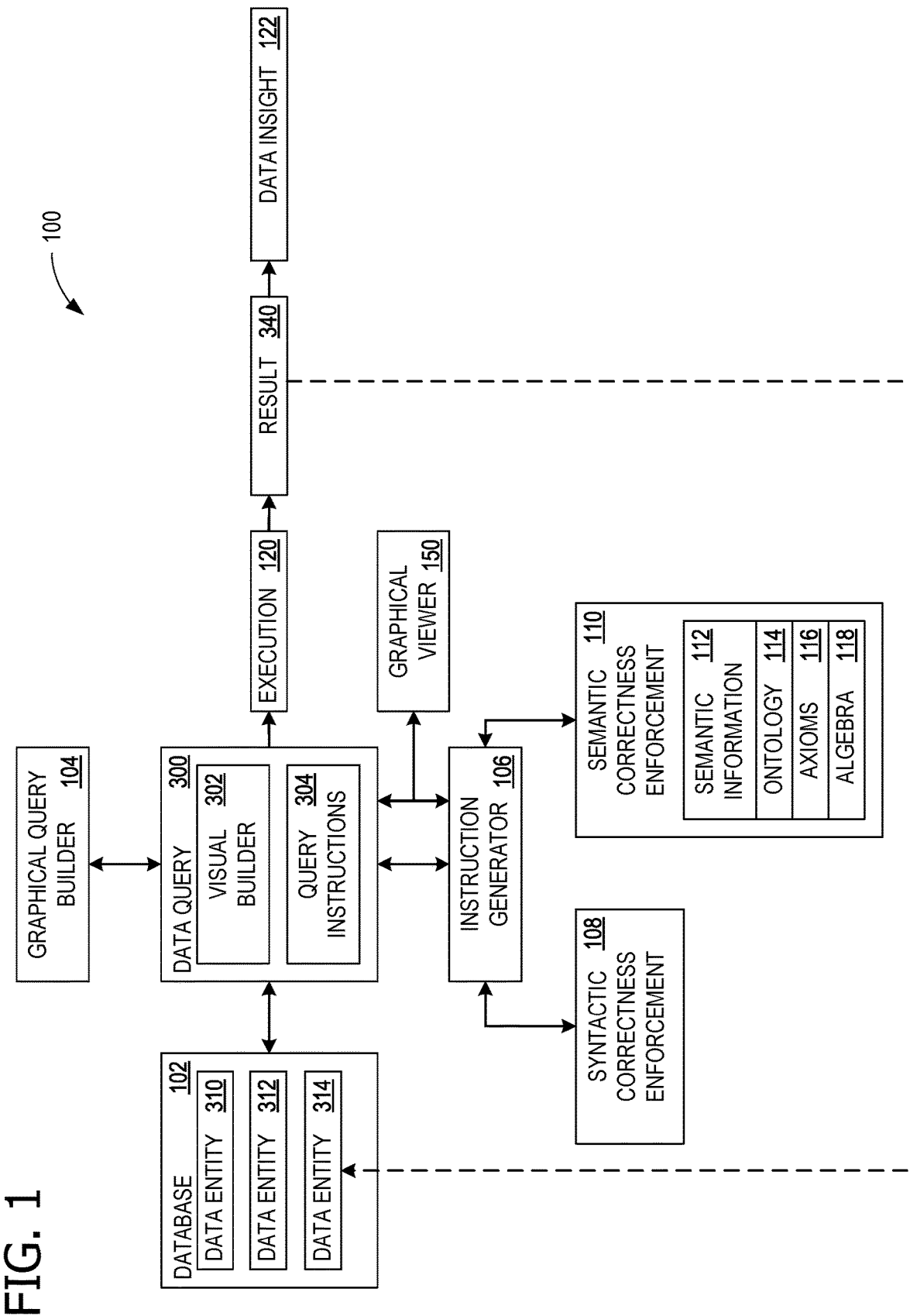
FIG. 1 illustrates an arrangement for advantageously enforcing both syntactic and semantic correctness of domain-specific data queries.

The various examples will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all examples.

Solutions for enforcing both syntactic and semantic correctness of domain-specific data queries include: receiving a data query; constraining an operation of the data query to enforce semantic correctness, wherein enforcing semantic correctness comprises: determining semantic information associated with each of a plurality of data entities; based on at least the semantic information, determining whether combining the two data entities of the plurality of data entities is allowed or is not allowed; based on at least determining that combining the two data entities is allowed, permitting combining the two data entities in the data query; and based on at least determining that combining the two data entities is not allowed, preventing combining (e.g., joining, aggregating, or grouping) the two data entities in the data query; and executing the data query. Some examples further include basing the permission on (at least) an ontology between the semantic information of the two data entities and a set of axioms.

By restricting the expressiveness of the query language using a data modeling theory under a specific domain (e.g., a customer data platform), a Turing complete language may be rendered into a Turing incomplete language, for which both syntactic and semantic correctness may be enforced. This may be accomplished by restricting the combining of data entities. Data entities may be combined by joining, aggregating, and/or grouping. Joining is connecting different data entities into a single coherent, logically correct data entity (e.g., combining multiple different tables into a single table). Aggregating data entities may include performing computations on the contents of the data entities, such as dividing, multiplying adding, or subtracting using the values within each of the respective data entities. In some examples, the applied ontology constrains joining, and the applied algebra constrains aggregating.

Aspects of the disclosure operate improve the operations of computing devices by constraining operations of data queries to enforce semantic correctness, for example by determining whether combining two data entities is allowed or is not allowed based on at least semantic information associated with each of the two data entities. Aspects of the disclosure operate in an unconventional manner by preventing combining (e.g., joining, aggregating, or grouping) two data entities when enforcing semantic correctness determines that combining the two data entities is not allowed. Thus, only domain-specific semantically correct data queries are executed.

FIG. 1 illustrates an arrangement 100 for advantageously enforcing both syntactic and semantic correctness of domain-specific data queries, for example a data query 300. A database 102 holds multiple data entities, such as a data entity 310 and a data entity 312, which are used in data query 300. In some examples, database 102 is stored on an example of computing device 1000 of FIG. 10. A programmer uses a graphical query builder 104 to construct a graphical representation of data query 300 as visual builder query 302. An instruction generator 106 converts visual builder query 302 into query instructions 304, which perform at least one operation (e.g., an operation 306, shown in FIG. 3) on data entities 310 and 312. In some examples, graphical query builder 104 and instruction generator 106 each runs on an example of computing device 1000 of FIG. 10.

Data entities may include fact entities, dimension entities, and profile entities. Fact entities represent events, activities, or measures and include fact tables of fact data, such as sales price, sale quantity, and time, distance, speed and weight measurements. In some examples, a fact table is defined as one of three types. A transaction fact table records facts about a specific event (e.g., sales events). A snapshot fact table records facts at a given point in time (e.g., account details at month end). An accumulating snapshot tables records aggregate facts at a given point in time (e.g., total month-to-date sales for a product). Fact tables may generally be assigned a surrogate key to ensure each row can be uniquely identified. This key may be a primary key.

Dimension entities include dimension attributes, such as product models, product colors, product sizes, geographic locations, and salesperson names. Dimension tables usually have a relatively small number of records compared to fact tables, but each record may have a very large number of attributes to describe the fact data. Dimensions may define a wide variety of characteristics, but some of the most common attributes defined by dimension tables include: time dimension tables that describe time at the lowest level of time granularity for which events are recorded; geography dimension tables that describe location data, such as country, state, or city; product dimension tables that describe products; employee dimension tables that describe employees, such as sales people; and range dimension tables that describe ranges of time, dollar values or other measurable quantities to simplify reporting. Dimension tables are generally assigned a surrogate primary key, usually a single-column integer data type, mapped to the combination of dimension attributes that form the natural key. A dimension entity may have foreign-key relationship to a profile entity or a fact entity. Profile entities may represent people.

Instruction generator 106 uses a syntactic correctness enforcement component 108 that ensures query instructions 304 have correct syntax, and a semantic correctness enforcement component 110 that ensures query instructions 304 have correct semantics. Semantic correctness enforcement component 110 includes a semantic information component 112, an ontology component 114, an axioms component 116, and an algebra component 118. Semantic information component 112 identifies data entity types (e.g., dimension, fact, profile); ontology component 114 identifies relationships between data entities, which constrains joining; and algebra component 118 constrains aggregating (e.g., by ensuring units of measurement are common). The operations of semantic correctness enforcement component 110 are described in further detail in relation to FIGS. 3 and 8.

Figure 5:
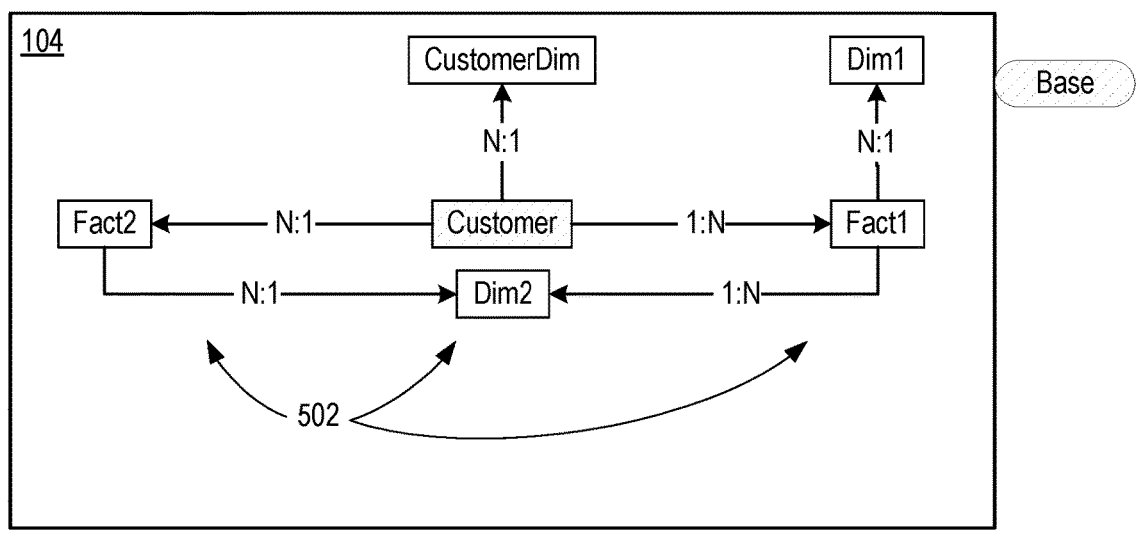
FIG. 5 illustrates a graphical view of a data query, as may be provided by the arrangement of FIG. 1.
Figure 6:
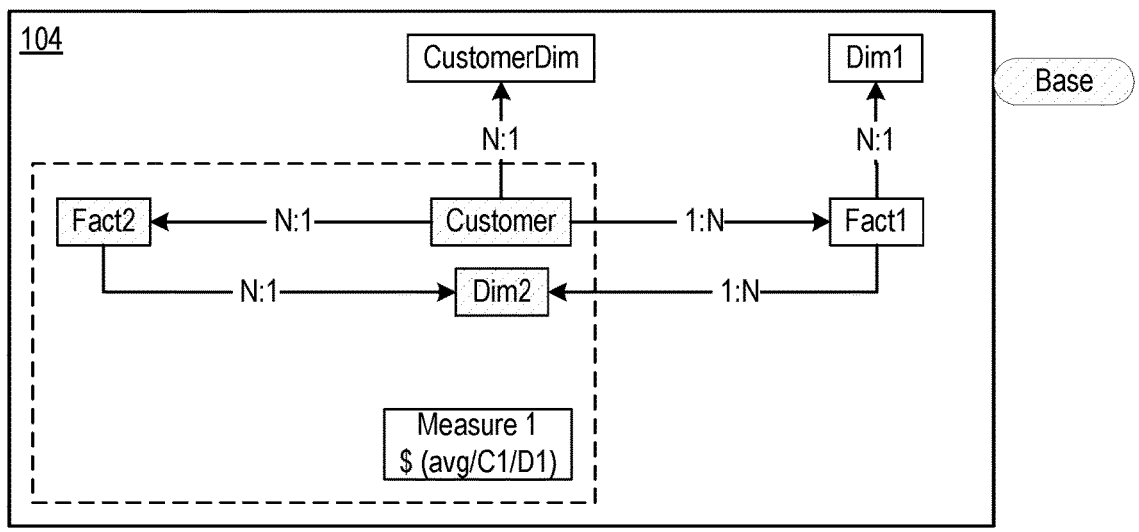
FIG. 6 illustrates another version of the a graphical view of FIG. 5.
Figure 7:
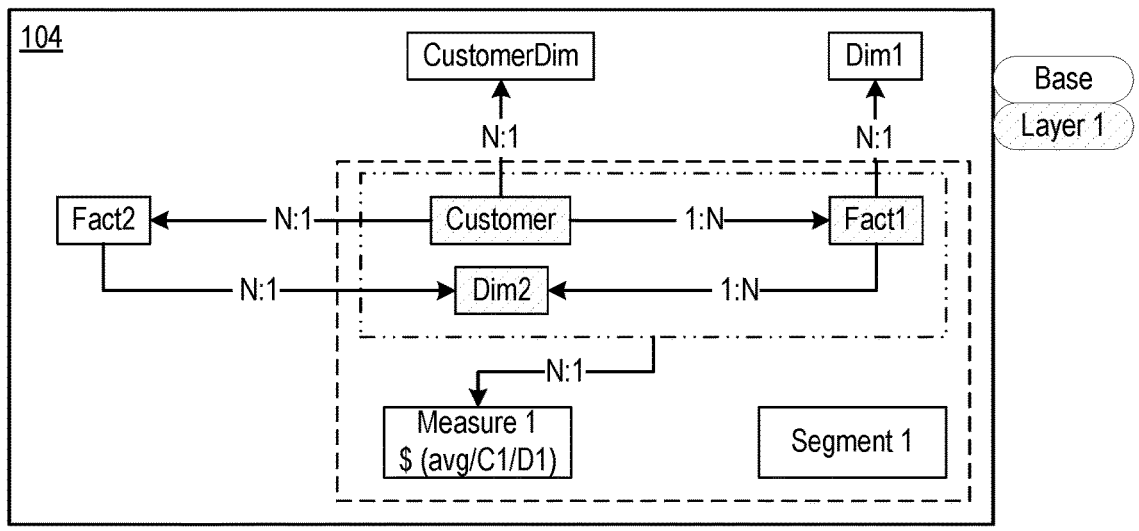
FIG. 7 illustrates another version of the a graphical view of FIG. 5.

A graphical viewer 150 shows visual builder query 302 and query instructions 304 of data query 300, provides graphical view 500 of FIG. 5, and also graphical views 500a and 500b of FIGS. 6 and 7, respectively. An execution module 120 executes data query 300 on data entities 310 and 312 to produce a useful result 340. In some examples, execution module 120 runs on an example of computing device 1000 of FIG. 10. In some examples, result 340 is sent to a data insight component 122 for use in business intelligence (BI) tasks. In some examples, result 340 is stored in database 102 as a new data entity 314, so that a subsequent data query may use data entity 314 in further operations (e.g., in a series of computations building up to a final result).

Figure 2:
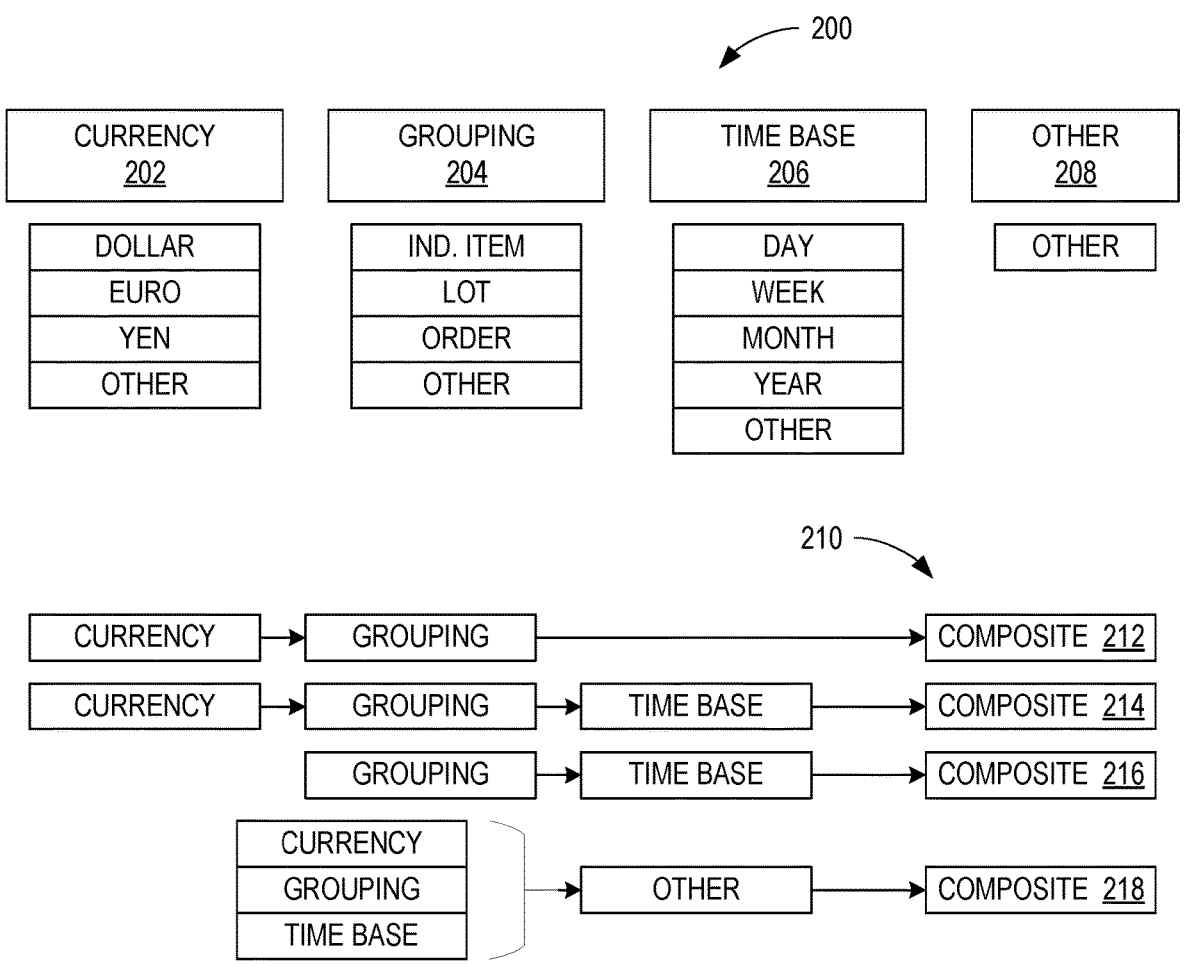
FIG. 2 illustrates generating composite units of measure from individual units of measure, as may occur in the arrangement of FIG. 1.

FIG. 2 illustrates generating composite units of measure from individual units of measure. A unit of measure 200 may be any of a currency 202, an item grouping 204, a time base 206, or another unit of measure 208. Currency 202 may be a dollar, a euro, a yen, or another currency unit. Item grouping 204 may be an individual item being tracked, a lot (e.g., a group of the same items), an order (e.g., a set of items purchased together, which may include different items, in some examples), or another grouping. Time base 206 may be a day, a week, a month, a year, or another time period, such as an hour or a financial quarter. Temporal information may be used for joining and aggregating, for example, time window aggregation, such as a rolling window aggregation. Time or temporal information may be an addition to non-temporal ontology and algebra to deal with a time dimension of the data, so that temporal information can assist with both joining and calculations (aggregating). The other unit of measure 208 may be any other unit of measure that is useful to track for BI purposes.

A composite unit of measure 212 may include currency and grouping, such as a currency unit per item or a currency unit per order. A composite unit of measure 214 may include currency, grouping, and a time base, such as a currency unit per item per week or a currency unit per order per month. A composite unit of measure 216 may include grouping and a time base, such as items per day or orders per year. Another composite unit of measure 218 may include one or more of currency unit, item grouping, and time base, along with another unit of measure. Any of composite units of measure 212-218 may be represented generically as composite unit of measure 210.

Figure 3:
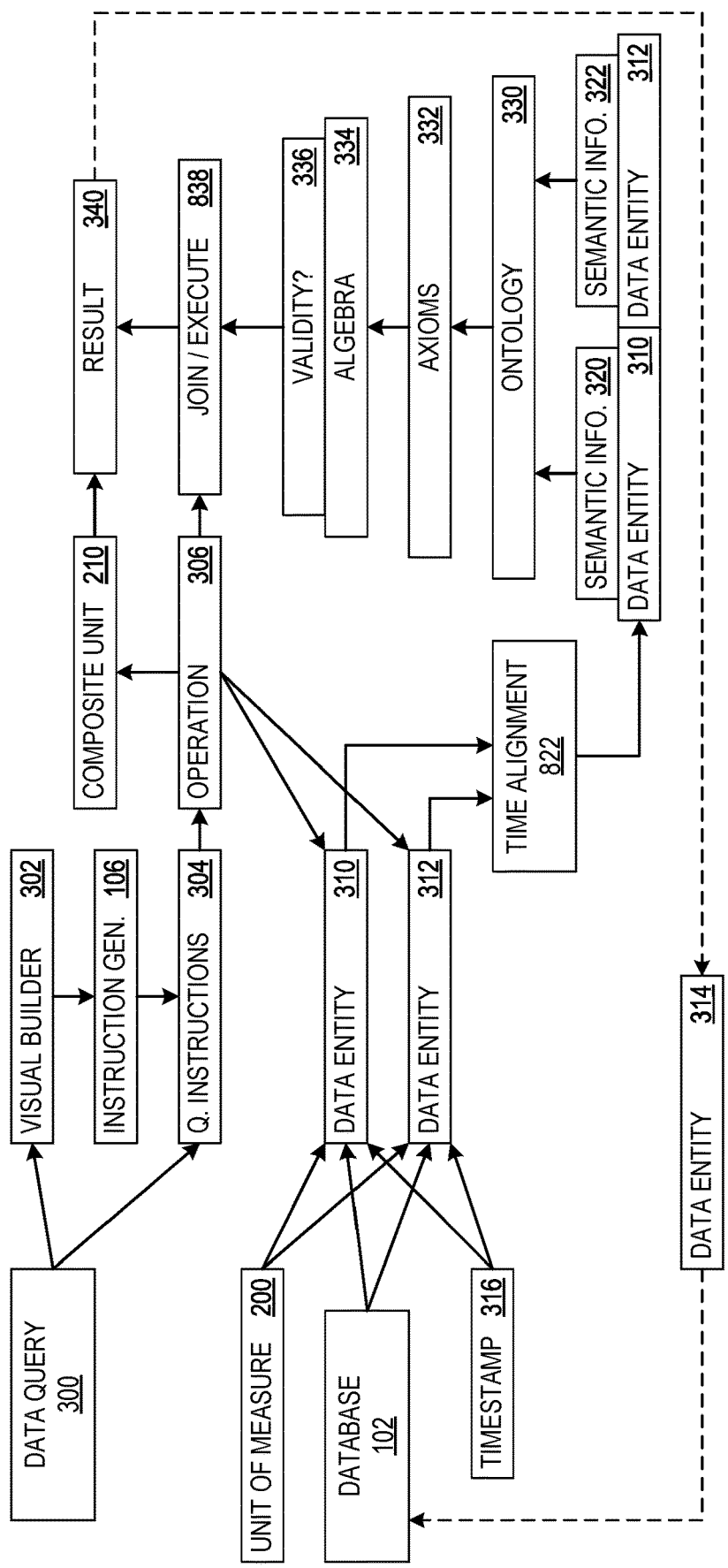
FIG. 3 illustrates the application of semantic information, an ontology, a set of axioms, algebra, and temporal relationship to data entities used in a data query, as may occur in the arrangement of FIG. 1.

FIG. 3 illustrates the application of semantic information, an ontology, a set of axioms, algebra, and temporal relationships to data entities 310 and 312 used in data query 300. Data query 300 comprises visual builder query 302 and query instructions 304. A user inputs visual builder query 302 using a graphical interface, and instruction generator 106 converts visual builder query 302 into query instructions 304. In some examples, the user may also edit query instructions 304. Query instructions 304 include an operation 306 that operates on data entities 310 and 312, for example combines data entities 310 and 312. Data entities 310 and 312 are pulled from database 102 and are each assigned a unit of measure 200 (or a composite unit of measure 210) and a timestamp 316. If unit of measure 200 for data entity 310 does not correspond to unit of measure 200 for data entity 312, operation 306 will not be permitted (and thus data query 300 will not execute), until one of data entities 310 and 312 undergoes a unit conversion so that unit of measure 200 for data entity 310 does (after conversion) correspond to unit of measure 200 for data entity 312.

Figure 8:
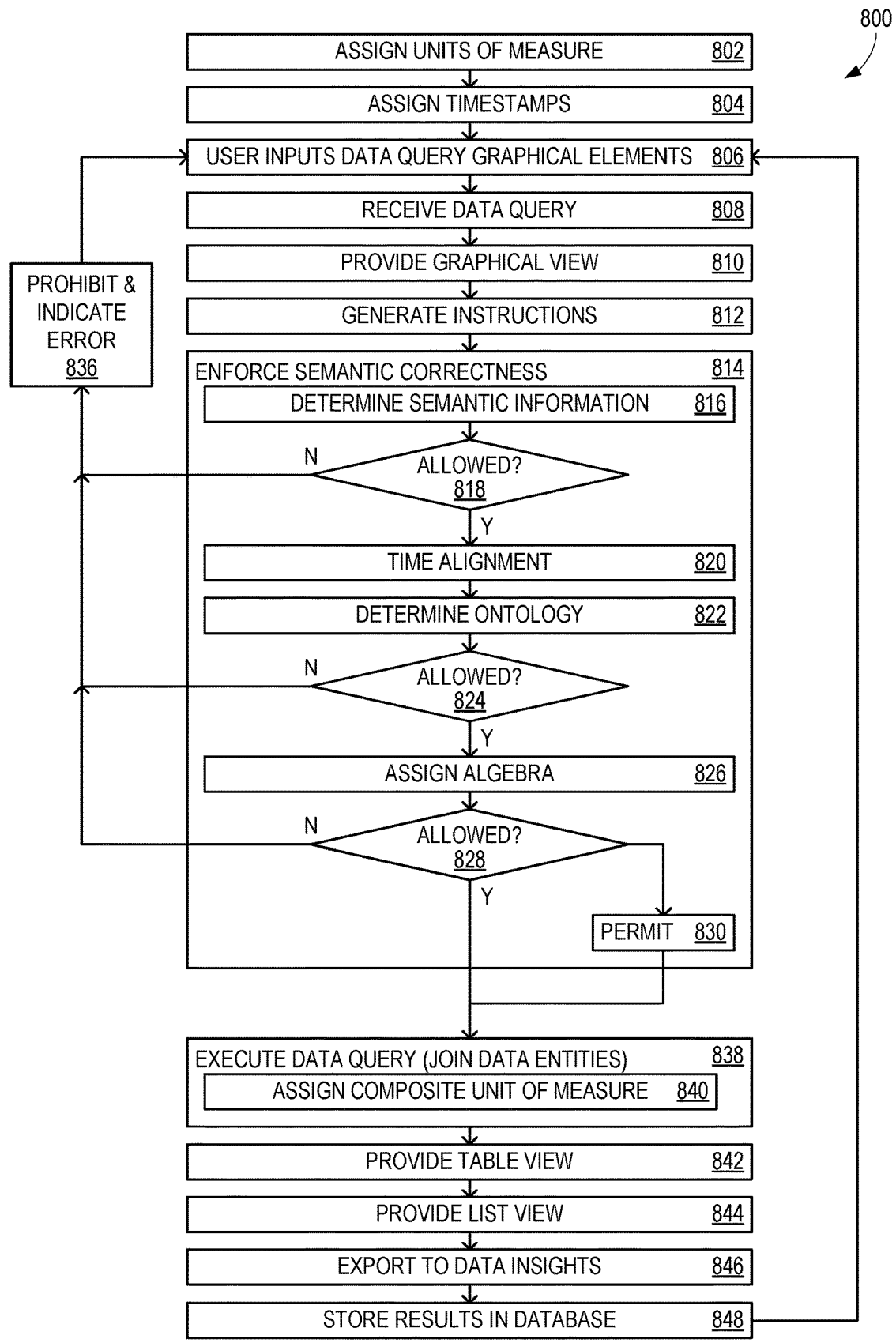
FIG. 8 is a flowchart illustrating exemplary operations that may performed by the arrangement of FIG. 1.

Timestamp 316 assigned to data entity 310 and timestamp 316 assigned to data entity 312 are used for a time alignment operation 822, which is described in further detail in relation to FIG. 8. Timestamps are used to ensure that operation 306 makes sense, for example by performing averaging on data that is concurrent (e.g., the timestamps are approximately the same), are immediately subsequent (e.g., one data set may be appended to another for a later calculation), or have another time relationship that is proper in relation to operation 306. In some examples, there are three uses of temporal information, including determining whether joining or aggregating (e.g., combining) is allowed, temporal joining, and time window aggregation. Temporal joining involves lining up records from 2 tables. Timestamps may have high precision such that, within a tolerance, two events occur together at the "same" time or identifying causations and effects (e.g., one event precedes another and so may have caused the second) to line up records. An example of time window aggregation is a rolling window aggregation. For example, aggregating data over a rolling 15-minute window.

Semantic information 320 is assigned to data entity 310 and semantic information 322 is assigned to data entity 312, by semantic information component 112. A semantic entity consists of the following items: a name that is unique within a namespace; a list of entity-level traits; a list of attributes; and a list of relations. Attributes describe fields on each record in the entity, and may be represented as columns in a table. In some examples, attributes contain: a first name; a second name; a data type; a date; and traits. Traits are properties of the attributes or entities. In some examples, a trait contains a trait name and explanation. In some examples, semantic entities are grouped into vertical specific (e.g., financial services, retail) taxonomies (e.g., namespaces). In some examples, semantic templates use semantic entity taxonomies to define a feature such as a measure, a segment, a rule, or another feature. Semantic templates may have both a declaration and a definition.

Ontology component 114 determines an ontology 330 between semantic information 320 and semantic information 322 and constraint joining data entities. Ontology 330 maps connections between semantic meanings of different entities. Axioms component 116 applies a set of axioms 332 to ontology 330, semantic information 320 and 322, and data entities 310 and 312. Axioms component 116 identify constraints on joining and aggregating. An example set of axioms is:

AXIOM 1: A unified profile entity is the truth of all profiles. Unification brings all profiles entities into a single unified profile entity where each record represents a unique person. Each record has a stable and unique customer identification. In some examples, only the winning profile is represented in a unified profile entity. When only a single profile entity exists and no unification is needed, the single profile entity becomes the truth of all profiles.

AXIOM 2: A unified profile entity and any profile entity are one-to-one. From axiom 1, a unified profile merges all distinct profiles from source profile entities that represents the same person into a single profile record. Therefore, a unified profile entity and any source profile entity establish a one-to-one relationship semantically. Axiom 2 provides an example of semantic meaning of data enforcing a stronger relationship than purely syntactic meaning of the data. Additionally, source profile entities are also one-to-one, because of the unification process.

AXIOM 3: A unified profile entity and a fact entity are one-to-many. Axiom 3 follows from the definition of unified profile entity and fact entity. Additionally, a source profile is also one-to-many.

AXIOM 4: A dimension entity and profile/fact entity are one-to-many. This requirement is enforced on dimension entities to prevent artificial inflation of profile or fact entity records.

AXIOM 5: Joining to a dimension entity does not change entity type. A dimension entity provides additional information to a profile entity or a fact entity and has a one-to-many relationship. Axiom 5 follows from the definition of dimension entity.

AXIOM 6: Joining a profile entity to another profile entity results in a profile entity. Joining two profile entities will result in another profile entity because of Axiom 1, and the fact that the joined entity also represents people. Axiom 2 and Axiom 6 prevent the joined entity from exploding one record from either side into multiple records.

AXIOM 7: Joining a profile entity to a fact entity results in a fact entity. Because of the definitions of profile entity and fact entity, with Axiom 3, the joined entity will have multiple records per person, each of which contains event, activity, or measure information of a person. This fits the definition of a fact entity.

AXIOM 8: A fact entity cannot join to another fact entity. Joining multiple fact entities may result in an unexpected product of different kinds of facts. However, in some scenarios, when one of the fact entities should instead be classified as a dimension entity, joining should be allowed.

Algebra component 118 applies one or more algebraic constructs 334 and makes a determination of algebraic validity 336, which may be expressed as a logic result: valid or invalid. Algebra component 118 constrains aggregating data entities. If algebraic validity 336 is valid, and the other elements (e.g., semantic information 320 and 322, ontology 330, and set of axioms 332) indicate the operation 306 is allowed, data query is executed in operation 838, which is described in further detail in relation to FIG. 8. In some examples, operation 838 combines (e.g., joins and/or aggregates) data entity 310 with data entity 312. Executed of data query 300 produces result 340, which may now have composite unit of measure 210. In some examples, result 340 is stored in database as data entity 314.

Figure 4:
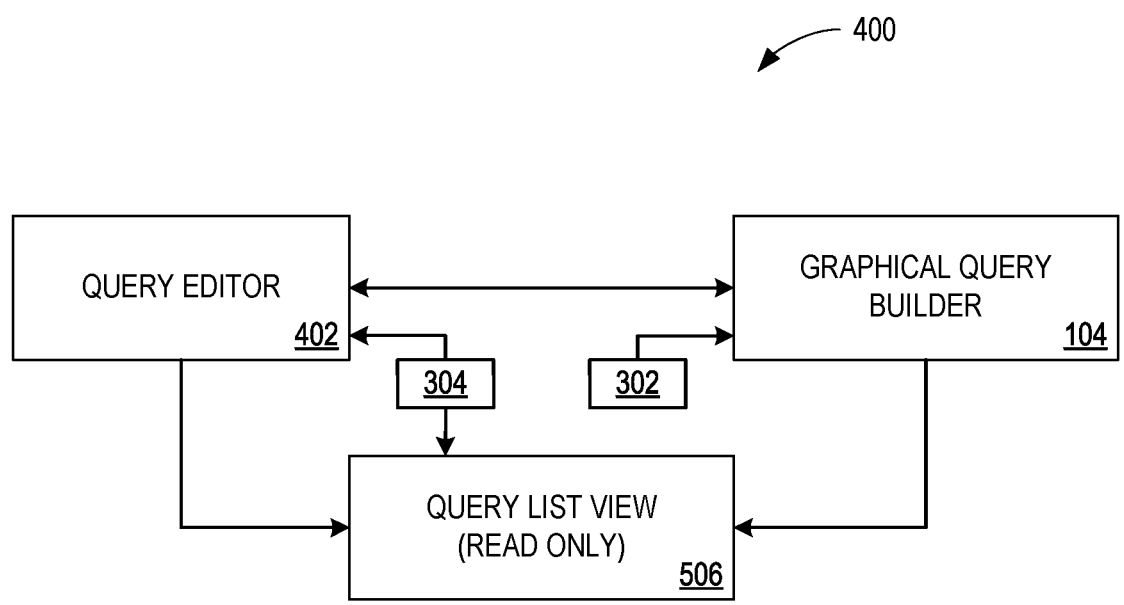
FIG. 4 illustrates editing options for the data query of the arrangement of FIG. 1.

FIG. 4 illustrates editing options for data query 300. A data query editing environment 400 has a query editor 402 that enables an advanced user to edit query instructions 304. With this arrangement, the user is able to construct data query 300 using both query editor 402 and graphical query builder 104 (operating on visual builder query 302). A read-only query list view 506 provides the user a listing of query instructions 304, as described further in relation to FIG. 5.

Data query editing environment 400 enables the user to construct data query 300 using a set of high-level operators in forms of templates and overloads for declarative definition of the segment and measure, minimizing the need avoiding writing code at the SQL programming level. Data query editing environment 400 further provides a layered approach (as shown further in relation to FIG. 7) of segments and measures to simplify workflow development for segment on measure, measure on measure, measure on segment, and segment on segment operations. In some examples, units of measurements ate automatically inferred and assigned to facilitate robust and error-free data query creation.

FIG. 5 illustrates a graphical view 500 of data query 300, as may be provided by graphical viewer 150 of FIG. 1. Graphical view 500 shows three components, a window for graphical query builder 104, a table view 504, and query list view 506. Graphical query builder 104 has icons 502 representing data entities, which may be selected for various actions or operations. Graphical query builder 104 provides a graphical view showing icons representing at least the two data entities with their semantic types and ontology graph. As indicated, graphical viewer 150 may be layered, with a base layer indicated as being currently selected. Table view 504 provides a preview of data entity values, more specifically, table view 504 provides a single table view that is the result of joins of tables selected in the graphical view. Query list view 506 is a read-only window that lists the current set of query instructions 304 (e.g., SQL code) for execution.

FIG. 6 illustrates a graphical view 500*a*, which may be a subsequent version of graphical view 500 after the user has already performed further development. Graphical query builder 104 indicates that the user has added a "Measure1" that performs an averaging calculation using currency units of dollars. A unit of measure 602 (e.g., currency 202) provides semantic information. Table view 504 not only provides feedback on actions, but also provides a basis for segment and/or measure creation. The user may select columns for grouping, aggregation, and/or filtering. Query list view 506 now shows additional instructions.

FIG. 7 illustrates a graphical view 500*b*, which may be a subsequent version of graphical view 500*a*. The user has now switched to a different layer, Layer1. Measure1 from the base layer is automatically added as a dimension. A comparison 702 in table view 504 is valid because the columns "ExpectedSales" and "Measure1" both have the same unit of measure (e.g., dollars). Query list view 506 now shows even more additional instructions, reflecting further development.

FIG. 8 is a flowchart 800 illustrating exemplary operations that may performed by arrangement 100. In some examples, operations described for flowchart 800 are performed by computing device 1000 of FIG. 10. Flowchart 800 commences with operation 802, which includes assigning a unit of measure (e.g. unit of measure 200 or composite unit of measure 210) to each of data entities 310 and 312. Operation 804 includes assigning timestamp 316 to each of data entities 310 and 312. A user inputs data query graphical elements to construct visual builder query 302 in operation 806. Operation 808 includes receiving data query 300. In some examples, data query 300 comprises visual builder query 302.

Operation 810 includes providing graphical view 500 showing icons 502 and representing at least data entities 310 and 312. Operation 812 includes generating query instructions 304 for data query 300 from visual builder query 302, query instructions 304 of data query 300 generated to be syntactically correct for performing operation 306 on data entities 310 and 312. Operation 814 includes constraining operation 306 of data query 300 to enforce semantic correctness, and includes operations 816-830. Operation 816 includes determining semantic information 320 and 322 (associated with data entities 310 and 312). Decision operation 818 includes, based on at least the semantic information, determining whether joining data entities 310 and 312 is allowed or is not allowed.

If there are no problems detected yet, operation 820 includes, based on at least timestamps 318 for data entities 310 and 312, aligning data entities 310 and 312 for joining, aggregating, and/or grouping (combining). Operation 822 includes determining ontology 330 between the semantic information 320 and 322 of data entities 310 and 312. Decision operation 824 applies set of axioms 332 to determine whether ontology 330 allows or does not allow combining of data entities 310 and 312. That is decision operation 824 includes, based on at least ontology 330 and set of axioms 332, determining whether joining data entities 310 and 312 is allowed or is not allowed. If not allowed, flowchart 800 moves to operation 836. Otherwise, flowchart 800 moves to operation 826.

Otherwise, algebraic constructs 334 are assigned in operation 826, and decision operation 828 determines algebraic validity 336 using set of axioms 332. Algebraic validity 336 validates whether certain calculations/aggregations are allowed. Thus, decision operation 828 includes, determining algebraic validity 336 for operation 306 of data query 300 and, based on at least algebraic validity 336, determining whether aggregating data entities 310 and 312 is allowed or is not allowed.

In some examples, part of decision operation 828 involves determining whether data entities 310 and 312 have a common unit of measure or a common composite unit of measure (e.g., unit of measure 200 or composite unit of measure 210 is the same for both data entities 310 and 312). Two data entities having different units of measure are not allowed to aggregate, and two data entities having different composite units of measure are also not allowed to aggregate. That is units of measure, whether single or composite, provide a check for combining (e.g., joining or aggregating) data entities. In some examples, the composite unit of measure is selected from the list consisting of: a first currency unit per item, a first currency unit per order, a first currency unit per first time base, a first currency unit per second time base, a second currency unit per item, a second currency unit per order, a second currency unit per first time base, a second currency unit per second time base, items per order, items per first time period, items per second time period, orders per first time period, and orders per second time period. In some examples, the first currency unit comprises a dollar and the second currency unit comprises a euro. In some examples, the first time base comprises a day, a week, or a month. In some examples, a week, a month, or a year.

If the units of measure are incompatible (e.g., dollar and yen or week and month, dollars per month and euros per year, or some other mismatch) flowchart 800 moves to operation 836. Operation 836 includes, based on at least determining that combining data entities 310 and 312 is not allowed, preventing combining data entities 310 and 312 in data query 300. In operation 836, the proffered operation is prohibited, and an error is indicated to the user, for example within graphical view 500. This invites the user to attempt to construct a different data query in operation 806, which will hopefully be permitted to execute.

By this point, flowchart 800 as examined at least semantic information 320 and 322, ontology 330, and algebraic validity 336, using set of axioms 332. Any one of those factors could move flowchart 800 to operation 836. Otherwise, operation 830 includes, based on at least determining that combining data entities 310 and 312 is allowed, permitting combining data entities 310 and 312 in data query 300. In some examples, this may be accomplished using a logical flag.

Operation 838 includes executing data query 300. Operation 840 includes (as part of operation 838), based on at least operation 306 of data query 300, assigning a composite unit of measure 210 to result 340 (data entity 314). In some examples, one or both of data entities 310 and 312 were produced by earlier data queries. In some examples, data entity 314 is used in a subsequent data query.

Operation 842 includes providing table view 504 of data entities 310 and 312. Operation 844 includes providing query list view 506 of data query 300, query list view 506 showing query instructions 304. Result 340 is exported to data insight component 122 in operation 846 and stored as data entity 314 in database 102, in operation 848. Flowchart 800 then returns to operation 806 for the user to use result 340 in a subsequent data query, or enter another new data query.

Figure 9:
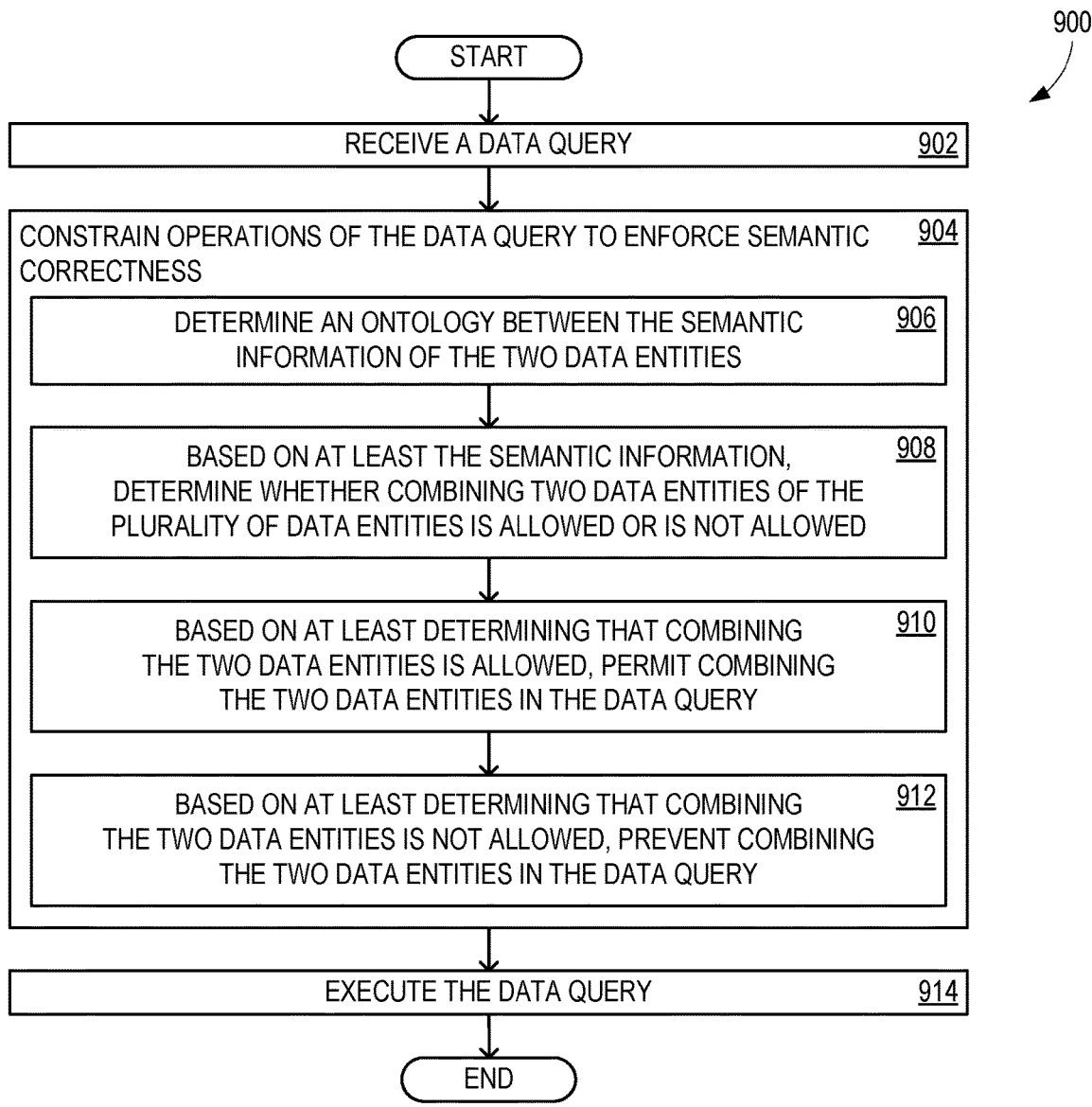
FIG. 9 is another flowchart illustrating exemplary operations that may performed by the arrangement of FIG. 1.

FIG. 9 is a flowchart 900 illustrating exemplary operations associated with arrangement 100. In some examples, operations described for flowchart 900 are performed by computing device 1000 of FIG. 10. Flowchart 900 commences with operation 902, which includes receiving a data query. Operation 904 includes constraining an operation of the data query to enforce semantic correctness, wherein enforcing semantic correctness comprises operations 906-912.

Operation 906 includes determining semantic information associated with each of a plurality of data entities. Operation 908 includes, based on at least the semantic information, determining whether combining two data entities of the plurality of data entities is allowed or is not allowed. Operation 910 includes, based on at least determining that combining the two data entities is allowed, permitting combining the two data entities in the data query. Operation 912 includes, based on at least determining that combining the two data entities is not allowed, preventing combining the two data entities in the data query. Operation 914 includes executing the data query.

Additional Examples

An example method of enforcing semantic correctness of domain-specific data queries comprises: receiving a data query; constraining an operation of the data query to enforce semantic correctness, wherein enforcing semantic correctness comprises: determining semantic information associated with each of a plurality of data entities; based on at least the semantic information, determining whether combining two data entities of the plurality of data entities is allowed or is not allowed; based on at least determining that combining the two data entities is allowed, permitting combining the two data entities in the data query; and based on at least determining that combining the two data entities is not allowed, preventing combining the two data entities in the data query; and executing the data query.

An example system for enforcing semantic correctness of domain-specific data queries comprises: a processor; and a computer-readable medium storing instructions that are operative upon execution by the processor to: receive a data query; constrain an operation of the data query to enforce semantic correctness, wherein enforcing semantic correctness comprises: determining semantic information associated with each of a plurality of data entities; based on at least the semantic information, determining whether combining two data entities of the plurality of data entities is allowed or is not allowed; based on at least determining that combining the two data entities is allowed, permitting combining the two data entities in the data query; and based on at least determining that combining the two data entities is not allowed, preventing combining the two data entities in the data query; and execute the data query.

One or more example computer storage devices has computer-executable instructions stored thereon, which, on execution by a computer, cause the computer to perform operations comprising: receiving a data query; constraining an operation of the data query to enforce semantic correctness, wherein enforcing semantic correctness comprises: determining semantic information associated with each of a plurality of data entities; based on at least the semantic information, determining whether combining two data entities of the plurality of data entities is allowed or is not allowed; based on at least determining that combining the two data entities is allowed, permitting combining the two data entities in the data query; and based on at least determining that combining the two data entities is not allowed, preventing combining the two data entities in the data query; and executing the data query.

Alternatively, or in addition to the other examples described herein, examples include any combination of the following:

- determining whether combining the two data entities is allowed or is not allowed comprises: determining an ontology between the semantic information of the two data entities; and based on at least the ontology and a set of axioms, determining whether combining the two data entities is allowed or is not allowed;
- based on at least the semantic information, the ontology, and the set of axioms, determining algebraic validity for an operation of the data query, wherein determining whether combining the two data entities is allowed or is not allowed further comprises: based on at least the algebraic validity, determining whether combining the two data entities is allowed or is not allowed.
- the data query comprises a visual builder query;
- providing a graphical view showing icons representing at least the two data entities;
- generating query instructions for the data query from the visual builder query, the query instructions of the data query generated to be syntactically correct for performing the operation on the two data entities;
- providing a table view of the two data entities;
- providing a query list view of the data query, the query list view showing the query instructions;
- assigning a unit of measure to each of the two data entities;
- determining whether the two data entities have a common unit of measure;
- two data entities having different units of measure are not allowed to combine;
- based on at least an operation of the data query, assigning a composite unit of measure to each of the two data entities;

determining whether the plurality of data entities have a common composite unit of measure;
two data entities having different composite units of measure are not allowed to combine;
assigning a timestamp to each of the two data entities;
based on at least the timestamps for the two data entities, aligning the two data entities for combining (e.g., joining and/or aggregating);
the composite unit of measure is selected from the list consisting of: a first currency unit per item, a first currency unit per order, a first currency unit per first time base, a first currency unit per second time base, a second currency unit per item, a second currency unit per order, a second currency unit per first time base, a second currency unit per second time base, items per order, items per first time period, items per second time period, orders per first time period, and orders per second time period;
the first currency unit comprises a dollar; and
the second currency unit comprises a euro.

While the aspects of the disclosure have been described in terms of various examples with their associated operations, a person skilled in the art would appreciate that a combination of operations from any number of different examples is also within scope of the aspects of the disclosure.

Example Operating Environment

Figure 10:
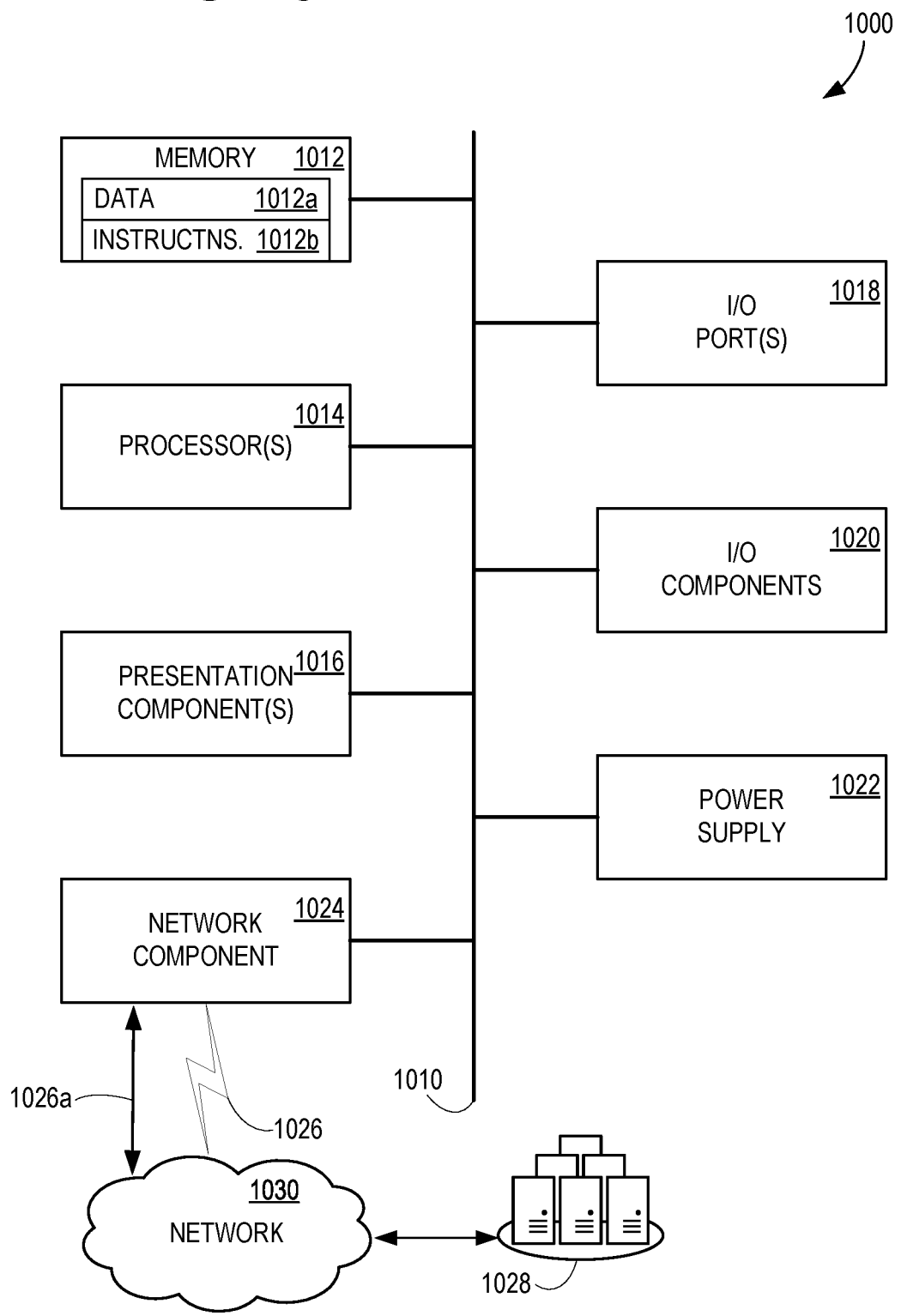
FIG. 10 is a block diagram of an example computing environment suitable for implementing some of the various examples disclosed herein.

FIG. 10 is a block diagram of an example computing device 1000 for implementing aspects disclosed herein, and is designated generally as computing device 1000. In some examples, one or more computing devices 1000 are provided for an on-premises computing solution. In some examples, one or more computing devices 1000 are provided as a cloud computing solution. In some examples, a combination of on-premises and cloud computing solutions are used. Computing device 1000 is but one example of a suitable computing environment and is not intended to suggest any limitation as to the scope of use or functionality of the examples disclosed herein, whether used singly or as part of a larger set.

Neither should computing device 1000 be interpreted as having any dependency or requirement relating to any one or combination of components/modules illustrated. The examples disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

Computing device 1000 includes a bus 1010 that directly or indirectly couples the following devices: computer-storage memory 1012, one or more processors 1014, one or more presentation components 1016, I/O ports 1018, I/O components 1020, a power supply 1022, and a network component 1024. While computing device 1000 is depicted as a seemingly single device, multiple computing devices 1000 may work together and share the depicted device resources. For example, memory 1012 may be distributed across multiple devices, and processor(s) 1014 may be housed with different devices.

Bus 1010 represents what may be one or more busses (such as an address bus, data bus, or a combination thereof). Although the various blocks of FIG. 10 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 10 and the references herein to a "computing device." Memory 1012 may take the form of the computer-storage media references below and operatively provide storage of computer-readable instructions, data structures, program modules and other data for the computing device 1000. In some examples, memory 1012 stores one or more of an operating system, a universal application platform, or other program modules and program data. Memory 1012 is thus able to store and access data 1012a and instructions 1012b that are executable by processor 1014 and configured to carry out the various operations disclosed herein.

In some examples, memory 1012 includes computer-storage media in the form of volatile and/or nonvolatile memory, removable or non-removable memory, data disks in virtual environments, or a combination thereof. Memory 1012 may include any quantity of memory associated with or accessible by the computing device 1000. Memory 1012 may be internal to the computing device 1000 (as shown in FIG. 10), external to the computing device 1000 (not shown), or both (not shown). Examples of memory 1012 in include, without limitation, random access memory (RAM); read only memory (ROM); electronically erasable programmable read only memory (EEPROM); flash memory or other memory technologies; CD-ROM, digital versatile disks (DVDs) or other optical or holographic media; magnetic cassettes, magnetic tape, magnetic disk storage or other magnetic storage devices; memory wired into an analog computing device; or any other medium for encoding desired information and for access by the computing device 1000. Additionally, or alternatively, the memory 1012 may be distributed across multiple computing devices 1000, for example, in a virtualized environment in which instruction processing is carried out on multiple computing devices 1000. For the purposes of this disclosure, "computer storage media," "computer-storage memory," "memory," and "memory devices" are synonymous terms for the computer-storage memory 1012, and none of these terms include carrier waves or propagating signaling.

Processor(s) 1014 may include any quantity of processing units that read data from various entities, such as memory 1012 or I/O components 1020. Specifically, processor(s) 1014 are programmed to execute computer-executable instructions for implementing aspects of the disclosure. The instructions may be performed by the processor, by multiple processors within the computing device 1000, or by a processor external to the client computing device 1000. In some examples, the processor(s) 1014 are programmed to execute instructions such as those illustrated in the flow charts discussed below and depicted in the accompanying drawings. Moreover, in some examples, the processor(s) 1014 represent an implementation of analog techniques to perform the operations described herein. For example, the operations may be performed by an analog client computing device 1000 and/or a digital client computing device 1000.

Presentation component(s) 1016 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 1000, across a wired connection, or in other ways. I/O ports 1018 allow computing device 1000 to be logically coupled to other devices including I/O components 1020, some of which may be built in. Example I/O components 1020 include, for example but without limitation, a microphone, joystick, game pad, satellite dish, scanner, printer, wireless device, etc.

The computing device 1000 may operate in a networked environment via the network component 1024 using logical connections to one or more remote computers. In some examples, the network component 1024 includes a network interface card and/or computer-executable instructions (e.g., a driver) for operating the network interface card. Communication between the computing device 1000 and other devices may occur using any protocol or mechanism over any wired or wireless connection. In some examples, network component 1024 is operable to communicate data over public, private, or hybrid (public and private) using a transfer protocol, between devices wirelessly using short range communication technologies (e.g., near-field communication (NFC), Bluetooth™ branded communications, or the like), or a combination thereof. Network component 1024 communicates over wireless communication link 1026 and/or a wired communication link 1026a to a cloud resource 1028 across network 1030. Various different examples of communication links 1026 and 1026a include a wireless connection, a wired connection, and/or a dedicated link, and in some examples, at least a portion is routed through the internet.

Although described in connection with an example computing device 1000, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality (MR) devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential, and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method of enforcing semantic correctness of domain-specific data queries, the method comprising:
assigning a timestamp to each of a plurality of data entities;
receiving a data query;
constraining an operation of the data query to enforce the semantic correctness, wherein enforcing the semantic correctness comprises:
determining semantic information associated with each of the plurality of data entities;
based on at least the semantic information, determining whether combining a first data entity and a second data entity of the plurality of data entities is allowed or is not allowed;
based on at least determining that combining the first data entity and the second data entity is allowed, aligning the first data entity and the second data entity based on a timestamp assigned to the first data entity and a timestamp assigned to the second data entity;
permitting combining the first data entity and the second data entity; and
based on at least determining that combining the first data entity and the second data entity is not allowed, preventing combining the first data entity and the second data entity; and
executing the data query.

2. The method of claim 1, wherein the combining the first data entity and the second data entity comprises joining, aggregating, or grouping the first data entity and the second data entity.

3. The method of claim 1, wherein determining whether combining the first data entity and the second data entity of the plurality of data entities is allowed or is not allowed comprises:
determining a temporal relationship between the timestamp assigned to the first data entity and the timestamp assigned to the second data entity; and
based on the temporal relationship, determining whether combining the first data entity and the second data entity is allowed or is not allowed.

4. The method of claim 3, wherein the combining the first data entity and the second data entity comprises a time window aggregation of the first data entity and the second data entity.

5. The method of claim 4, wherein the time window aggregation is a rolling window aggregation.

6. The method of claim 1, further comprising:
determining ontology between the semantic information of the first data entity and the semantic information of the second data entity;
applying a set of axioms to determine whether the ontology allows or does not allow joining the first data entity and the second data entity; and
based on determining that the ontology does not allow joining the first data entity and the second data entity, preventing joining the first data entity and the second data entity.

7. The method of claim 1, further comprising:
determining algebraic validity using a set of axioms;
based on at least the algebraic validity, determining whether aggregating the first data entity and the second data entity is allowed or is not allowed; and
based on at least determining aggregating the first data entity and the second data entity is not allowed, preventing aggregating the first data entity and the second data entity.

8. A system for enforcing semantic correctness of domain-specific data queries, the system comprising:
a processor; and
a computer-readable medium storing instructions that are operative upon execution by the processor to:
receive a data query;
constrain an operation of the data query to enforce the semantic correctness, wherein enforcing the semantic correctness comprises:
determining semantic information associated with each of a plurality of data entities;
based on at least the semantic information, determining whether combining a first data entity and a second data entity of the plurality of data entities is allowed or is not allowed;
based on at least determining that combining the first data entity and the second data entity is allowed, aligning the first data entity and the second data entity based on a timestamp assigned to the first data entity and a timestamp assigned to the second data entity;
permitting combining the first data entity and the second data entity; and
based on at least determining that combining the first data entity and the second data entity is not allowed, preventing combining the first data entity and the second data entity; and
execute the data query.

9. The system of claim 8, wherein the combining the first data entity and the second data entity comprises joining, aggregating, or grouping the first data entity and the second data entity.

10. The system of claim 8, wherein determining whether combining the first data entity and the second data entity of the plurality of data entities is allowed or is not allowed comprises:
determining a temporal relationship between the timestamp assigned to the first data entity and the timestamp assigned to the second data entity; and
based on the temporal relationship, determining whether combining the first data entity and the second data entity is allowed or is not allowed.

11. The system of claim 10, wherein the combining the first data entity and the second data entity comprises a time window aggregation of the first data entity and the second data entity.

12. The system of claim 11, wherein the time window aggregation is a rolling window aggregation.

13. The system of claim 8, wherein the instructions are further operative to:
determine ontology between the semantic information of the first data entity and the semantic information of the second data entity;
apply a set of axioms to determine whether the ontology allows or does not allow joining the first data entity and the second data entity; and
based on determining that the ontology does not allow joining the first data entity and the second data entity, prevent joining the first data entity and the second data entity.

14. The system of claim 8, wherein the instructions are further operative to:
determine algebraic validity using a set of axioms;

based on at least the algebraic validity, determine whether aggregating the first data entity and the second data entity is allowed or is not allowed; and based on at least determining aggregating the first data entity and the second data entity is not allowed, prevent aggregating the first data entity and the second entity.

15. One or more computer storage devices having computer-executable instructions stored thereon, which, on execution by a computer, cause the computer to perform operations comprising:

receiving a data query;

constraining an operation of the data query to enforce semantic correctness, wherein enforcing the semantic correctness comprises:

determining semantic information associated with each of a plurality of data entities;

based on at least the semantic information, determining whether combining a first data entity and a second data entity of the plurality of data entities is allowed or is not allowed;

based on at least determining that combining the first data entity and the second data entity is allowed, aligning the first data entity and the second data entity based on a timestamp assigned to the first data entity and a timestamp assigned to the second data entity;

permitting combining the first data entity and the second data entity; and based on at least determining that combining the first data entity and the second data entity is not allowed, preventing combining the first data entity and the second data entity; and executing the data query.

16. The one or more computer storage devices of claim 15, wherein the combining the first data entity and the second data entity comprises joining, aggregating, or grouping the first data entity and the second data entity.

17. The one or more computer storage devices of claim 15, wherein determining whether combining the first data entity and the second data entity of the plurality of data entities is allowed or is not allowed comprises:

determining a temporal relationship between the timestamp assigned to the first data entity and the timestamp assigned to the second data entity; and based on the temporal relationship, determining whether combining the first data entity and the second data entity is allowed or is not allowed.

18. The one or more computer storage devices of claim 16, wherein the combining the first data entity and the second data entity comprises a time window aggregation of the first data entity and the second data entity.

19. The one or more computer storage devices of claim 18, wherein the time window aggregation is a rolling window aggregation.

20. The one or more computer storage devices of claim 15, wherein the operations further comprise:

determine ontology between the semantic information of the first data entity and the semantic information of the second data entity;

apply a set of axioms to determine whether the ontology allows or does not allow joining the first data entity and the second data entity; and based on determining that the ontology does not allow joining the first data entity and the second data entity, prevent joining the first data entity and the second data entity.

* * * * *